March 24, 1925.
W. T. SEARS
1,530,790
SAFETY DEVICE FOR DRILLING MACHINES
Filed Nov. 2, 1921
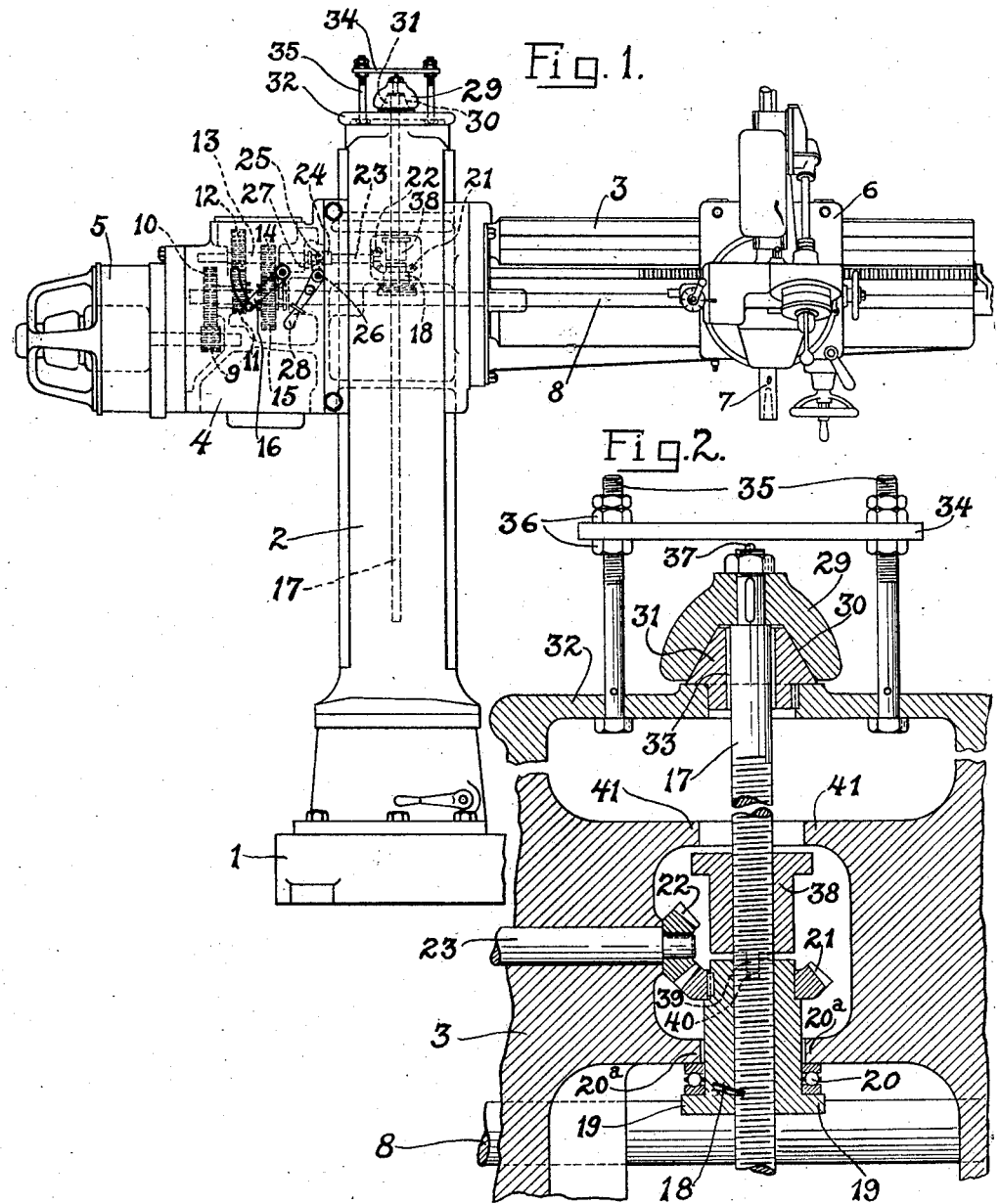
Inventor
W. T. Sears
By Lawrie．Witter
Attorney Patented Mar. 24, 1925.

1,530,790

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

SAFETY DEVICE FOR DRILLING MACHINES.

Application filed November 2, 1921. Serial No. 512,336.

*To all whom it may concern:*

Be it known that I, WILLARD T. SEARS, a citizen of the United States, residing at Montclair, in the county of Essex and State of New Jersey, have invented certain new and useful Improvements in Safety Devices for Drilling Machines, of which the following is a specification.

This invention relates to safety devices and particularly to such a device as used in connection with the elevating screw and nut on radial drills and like machines. Damage to such a machine often results from carelessness or negligent operation thereof or from various other possible causes. It is the primary object of this invention to provide means in connection with the screw and nut of the said elevating mechanism for positively preventing such damage.

In the drilling machine shown in my Patent No. 1,296,863 dated March 11th, 1919, should the drill arm strike an obstruction in the lowering operation thereof, the rotation of the elevating nut is adapted to raise the elevating screw sufficiently to disengage the same from the column and permit the screw to thereafter rotate with the nut. Continued rotation of the nut and screw together thereafter is idle motion and can in no way damage the machine. However, in order to positively permit only a slight upward movement of the screw and thereby create a greater friction between the nut and screw to cause the same to rotate together in such slightly elevated position, I provide a stop slightly spaced above the screw and acting to perform such function. It is accordingly another object of the invention to provide a stop means in connection with an elevating screw of the type stated and for the purpose defined.

The heavy load to which the elevating nut and screw are usually subjected frequently causes the threads of the nut to wear and possibly strip over the threads of the screw, thus permitting the load to drop and damage the machine. It is an object of the invention to provide means supplemental to the elevating nut for positively preventing such action in all positions of the elevating nut on the screw.

With the above and other objects in view, my invention consists in the features of construction and operation set forth in the following specification and illustrated in the accompanying drawing. In such drawing annexed hereto and forming a part of this specification I have shown certain specific embodiments of my invention in connection with a radial drill but it will be understood that the invention can be otherwise embodied and that the drawing is not to be construed as defining or limiting the scope of the invention, the claims appended to this specification being relied upon for that purpose.

Referring to the figures of the drawing:

Figure 1 is an elevational view of a radial drilling machine.

Fig. 2 is an enlarged fragmentary vertical sectional view through the top of the drill column and through the drill arm within the column, such views particularly illustrating the novel features of my invention.

Referring more specifically to the drawing by reference characters, 1 represents the base, 2 the column and 3 the vertically adjustable arm of a radial drilling machine. As illustrated, this machine is substantially that shown in my aforesaid patent. The column 2 is preferably divided and the arm 3 or a carrying member therefor extends between the two parts of the column and is suitably guided therein for vertical movement. Rigidly mounted at the rear end of the arm is a gear casing 4 which carries an electric motor 5. Slidably mounted on the other end of the arm is a saddle 6 carrying a head provided with a rotatable drill spindle 7. A driving shaft 8 extends longitudinally of the arm and serves to drive the spindle.

Mounted on the shaft of the motor 5 is a pinion 9 which meshes with a gear 10 loosely mounted on the shaft 8. Connected with the gear 10 is a pinion 11 which meshes with a gear 12 on a countershaft 13. Mounted on the shaft 13 is a pinion 14 which is adapted to mesh with a gear 15 splined on the shaft 8 and movable by means of a hand lever 16. With the parts in the position shown in Fig. 1, the shaft 8 is driven at a relatively low speed indirectly from the motor through the countershaft 13. When the gear 15 is moved toward the left it is disengaged from the pinion 14 and is engaged with clutch teeth at the end of the pinion 11, thus making a direct high speed drive from the gear 10 to the shaft 8. It will be understood that the entire gear mechanism, as described, is mounted within the casing 4 and that this casing, with the gearing and with the motor 5, is vertically movable with the arm 3.

For adjusting the arm and connected parts vertically, there is provided a vertical screw 17 and a nut 18 and means for rotating one of them relatively to the other. Preferably, the screw is normally fixed against rotation and the nut is turned, preferably by power derived from the motor 5. As illustrated, the nut 18 is provided at its lower end with a projecting portion 19 extending therearound. This portion provides a supporting bearing for the arm. The screw 17 is suitably supported in a manner to be described and the nut 18 serves to support the entire weight of the arm and the associated parts upon the screw. Preferably, a ball-bearing 20 is interposed between the arm and the nut, that is, between the portion 20ª of the arm and the portion 19 of the nut. Secured to or formed integrally with the nut 18 is a bevel gear 21 which meshes with a bevel gear 22. The gear 22 is carried by a shaft 23 in alinement with the aforesaid shaft 13. A jaw clutch element 24 is secured to the shaft 23 and a companion grooved jaw clutch element 25 is splined to the shaft 13. For shifting the clutch element 25 there is provided a rock shaft 26 carrying a forked lever 27 projecting into the groove of the clutch element 25. The rock shaft 26 carries a handle 28 by means of which the clutch may be operated.

Assuming the motor to be in operation, and the clutch elements 25 and 24 to be engaged, it will be seen that rotative movement will be transmitted from the shaft 13 through the bevel gears 22 and 21 to the nut 18. The motor can be rotated in either direction under the control of a controller, not shown, and thus the nut 18 can be rotated in either direction. As the nut rotates it moves upward or downward along the screw 17, carrying the arm 3 and the associated parts with it.

I have stated that the screw 17 is normally fixed against rotation; but in accordance with the invention I provide means whereby the screw may turn when necessary to protect the machine from injury. As illustrated, the screw is supported at the top of the column by a frictional device. A cap 29 is secured to the top of the screw and is provided with a conical recess 30 therein fitting over the upper conical end of an element 31 non-rotatably secured in a plate 32 secured to the top of the column. During normal operation the frictional resistance between the cap 29 and element 31 will prevent the screw 17 from turning.

The operator, through inadvertence or carelessness, may permit the nut to turn in a direction to move the arm 3 downward too far. The arm on its downward movement may meet some obstruction, such for instance as a piece of work about to be drilled; or it may move downward until it reaches the bottom of the column. In either case the weight of the arm will be removed from the screw and carried by the obstruction or by the bottom of the column. When the screw is thus relieved from weight, the frictional contact at 30 and 31 is reduced because of the decreased pressure and thus the screw 17 is permitted to turn freely with the nut. This rotative movement of the screw will continue indefinitely without injury to the machine which would otherwise result.

While the construction, as described, ordinarily prevents any damage to the machine in the manner stated, it is possible that through some normally remote cause, sufficient friction may be developed against the screw to prevent its free rotation with the nut after it is relieved of the weight of the arm. For example, it may be stated that a slight crookedness of the screw would quite likely cause sufficient friction of the screw within cone 31 at 33 to prevent such free rotation of the screw. Such friction tends to hold the screw against turning and if the nut continues to revolve, the screw will then climb up until the friction at 33 is removed sufficiently to allow the screw to turn freely with the nut. The result of this action is that if the arm of the drill strikes an obstruction in lowering, the screw will tend to climb upwardly and if the obstruction which supports the arm gives way, or is suddenly removed, the arm and its cooperating parts will drop until brought up by the cap member 29 at the top or by some other obstruction.

In order to positively prevent such an occurrence, I provide a stop for positively limiting the upward movement of the screw. As illustrated in the drawing, this stop comprises a plate 34 supported above the upper end of the screw by means of a pair of bolts 35 mounted in the column. Nuts 36 are provided on the bolts for vertically adjusting the plate. For the purpose of avoiding friction against the screw and thereby hindering its free rotation with the nut 18, I mount an anti-friction ball 37 in the top of the screw in a position to engage the stop plate 34. In practice, the plate 34 is adjusted vertically to about $\tfrac{1}{16}''$ above the ball 37. The stop positively prevents excessive climbing of the screw and the engagement of the ball with the stop exerts sufficient pressure on the inter-engaging threads of the nut and screw to force the screw to turn with the nut.

As has been heretofore stated, the load of the arm may frequently cause the threads of the nut to wear away sufficiently to cause a stripping thereof over the screw, thus permitting the arm to drop and damage the machine. I herein provide means, as illustrated in Fig. 2, for preventing such damage. Above the nut 18 is an auxiliary nut 38 which is forced to turn with the nut 18 on the screw by the projection 39 on the nut 38 engaging in the slot 40 of the nut 18. Nuts 18 and 38, therefore, rotate together as a unit and, if desired, may be considered as one nut comprising two interconnected sections 18 and 38. It should be understood, however, that normally the section 18 supports the entire load of the arm and the section 38 rotates freely therewith on the screw. It will furthermore be seen that while there may be considerable wear on the threads of the section 18, there will be practically no wear on the threads of section 38. As illustrated, a portion 41 of the arm overhangs the nut section 38 in such a manner that should the threads of the section 18 strip over the screw and permit the arm to fall, the portion 41 will drop onto the nut 18 which will support the arm against further drop, thereby preventing damage to the machine.

Attention is furthermore called to the fact that the parts are so proportioned that in case the arm falls, as has been described, the projection 39 will be entirely disengaged from the slot 40, thereby preventing further damage and making it impossible to raise or lower the arm until the nut 18 is replaced.

What I claim is:

1. In a machine of the class described, the combination of a screw, a nut threadedly engaging the screw and adapted to support a load thereon in one direction, means for rotating the nut, means for normally supporting the screw against movement in the direction of the load and against rotation, and means on the machine adjacent and adapted to cooperate with the screw when relieved of its load to permit a slight longitudinal movement thereof in the opposite direction to release the screw for rotation but preventing such longitudinal movement beyond a predetermined distance.

2. In a drilling machine comprising a vertical column and an arm vertically adjustable thereon, the combination with the arm, of a supporting and adjusting means therefor comprising a vertical screw and a nut, power means for turning one of them relatively to the other to raise or lower the arm, means supporting the other and normally holding it against rotation, and means permitting a slight upward movement of the said other element, when downward movement of the arm is obstructed, to release the said element for rotation, but preventing such upward movement thereof beyond a predetermined distance.

3. In a drilling machine, the combination of a column, an arm mounted for vertical movement on the column, a screw supported vertically in the column and normally against rotation, a nut threadedly engaging the screw and serving to support the arm, means for rotating the nut, and means permitting a slight upward movement of the screw, when downward movement of the arm is obstructed, to release the screw for rotation but preventing such upward movement beyond a predetermined distance.

4. In a drilling machine, the combination of a column, an arm mounted for vertical movement on the column, a screw extending vertically in the column and supported at the top thereof normally against rotation, a nut threadedly engaging the screw and serving to support the arm, means for rotating the nut, and means adjacent the top of the column and screw permitting a slight upward movement of the screw, when relieved of the weight of the arm, to release the same for rotation with the nut but preventing such upward movement beyond a predetermined distance.

5. In a drilling machine, the combination of a vertically extending column, an arm mounted for vertical movement on the column, a normally stationary screw supported on the column, means for supporting the screw against axial downward movement, a nut rotatably mounted in the arm and threadedly engaging the screw, means for rotating the nut to move the arm vertically relative to the column and screw, an auxiliary nut threadedly engaging the screw, means loosely connecting the nuts whereby the auxiliary nut is rotated from the main nut, and means permitting disengaging the connection between the nuts and for supporting the arm on the auxiliary nut should the main nut fail.

In testimony whereof, I hereto affix my signature.

WILLARD T. SEARS.